Sept. 12, 1933. K. A. NYLANDER ET AL 1,926,168
CHEMICAL FILTERING DEVICE FOR WATER
Filed June 28, 1928  7 Sheets-Sheet 1
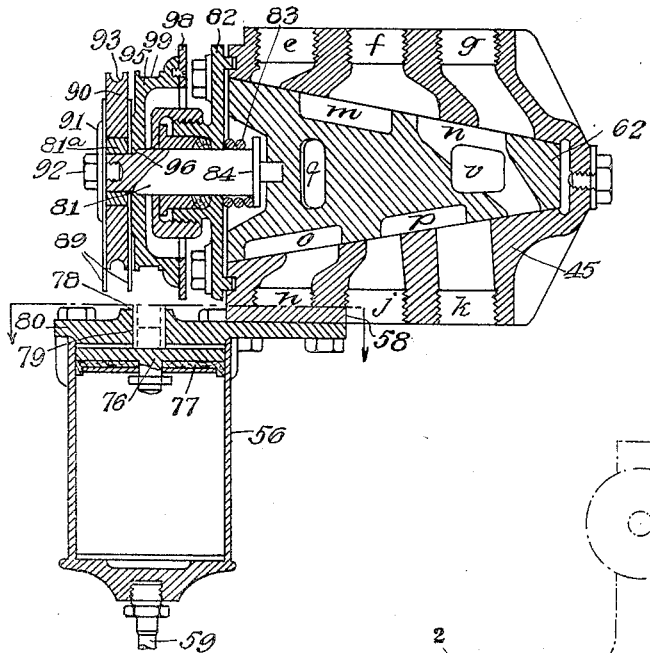
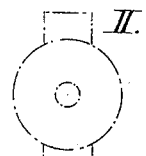
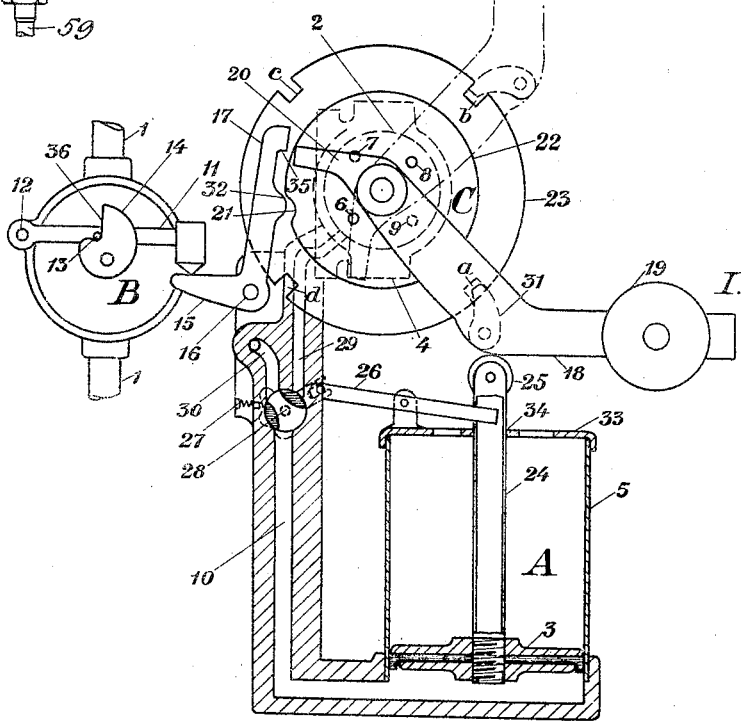

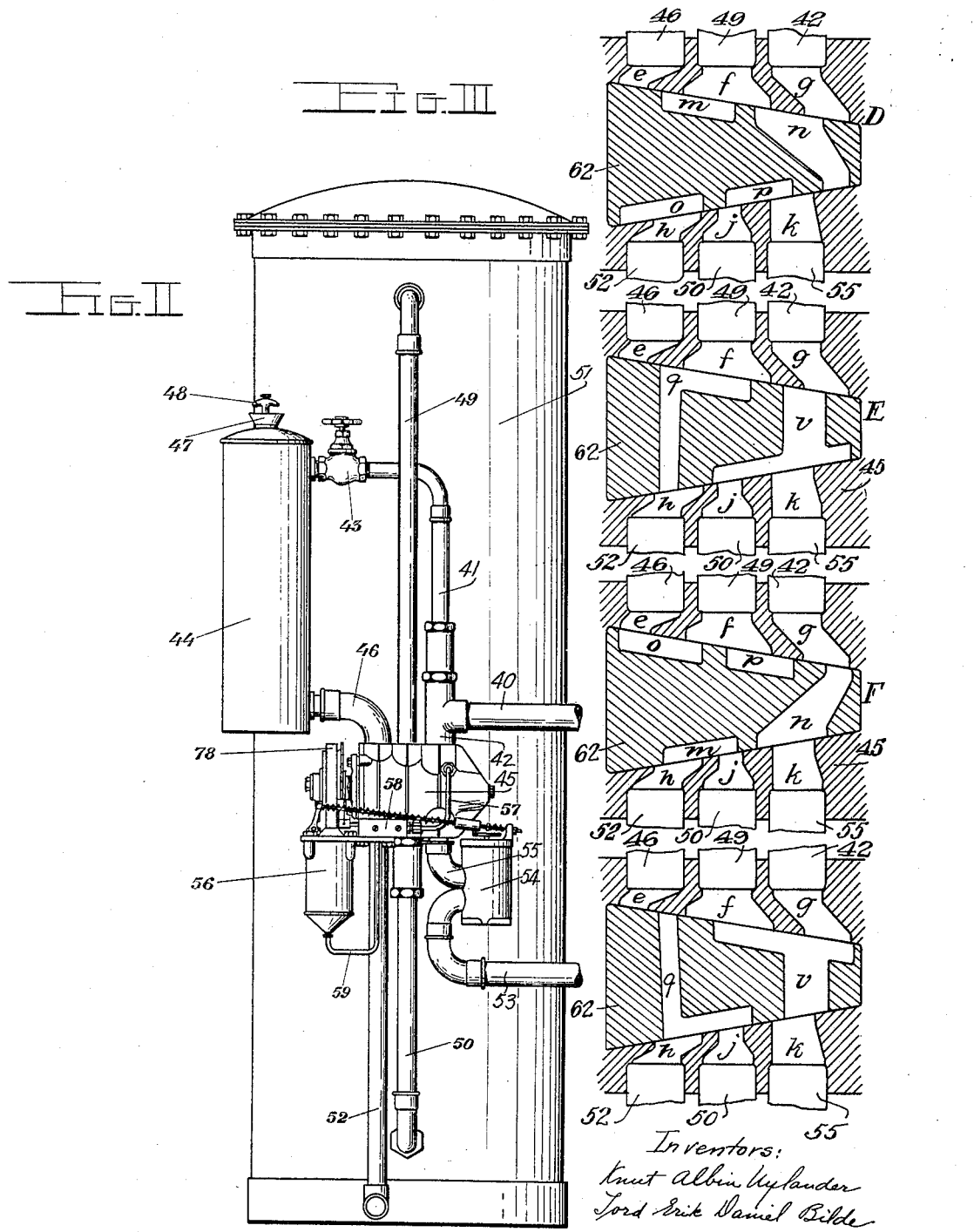

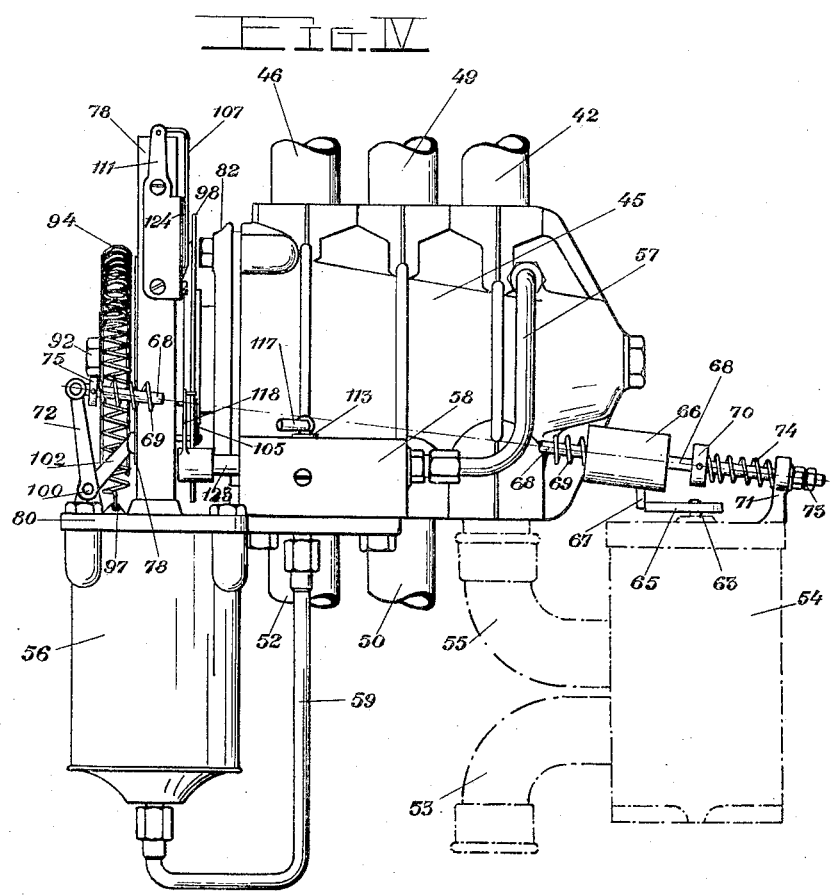

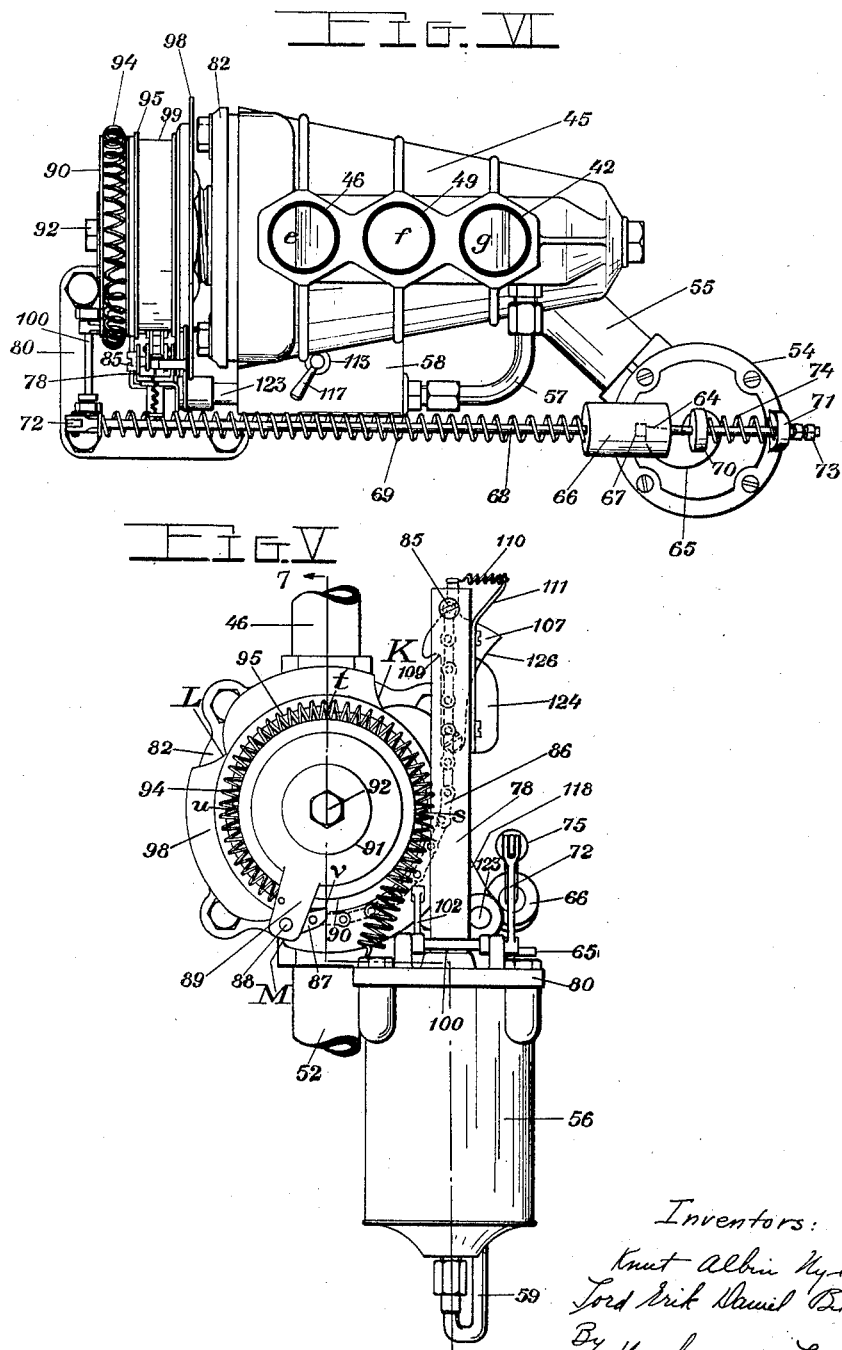

Sept. 12, 1933.   K. A. NYLANDER ET AL   1,926,168
CHEMICAL FILTERING DEVICE FOR WATER
Filed June 28, 1928   7 Sheets-Sheet 5
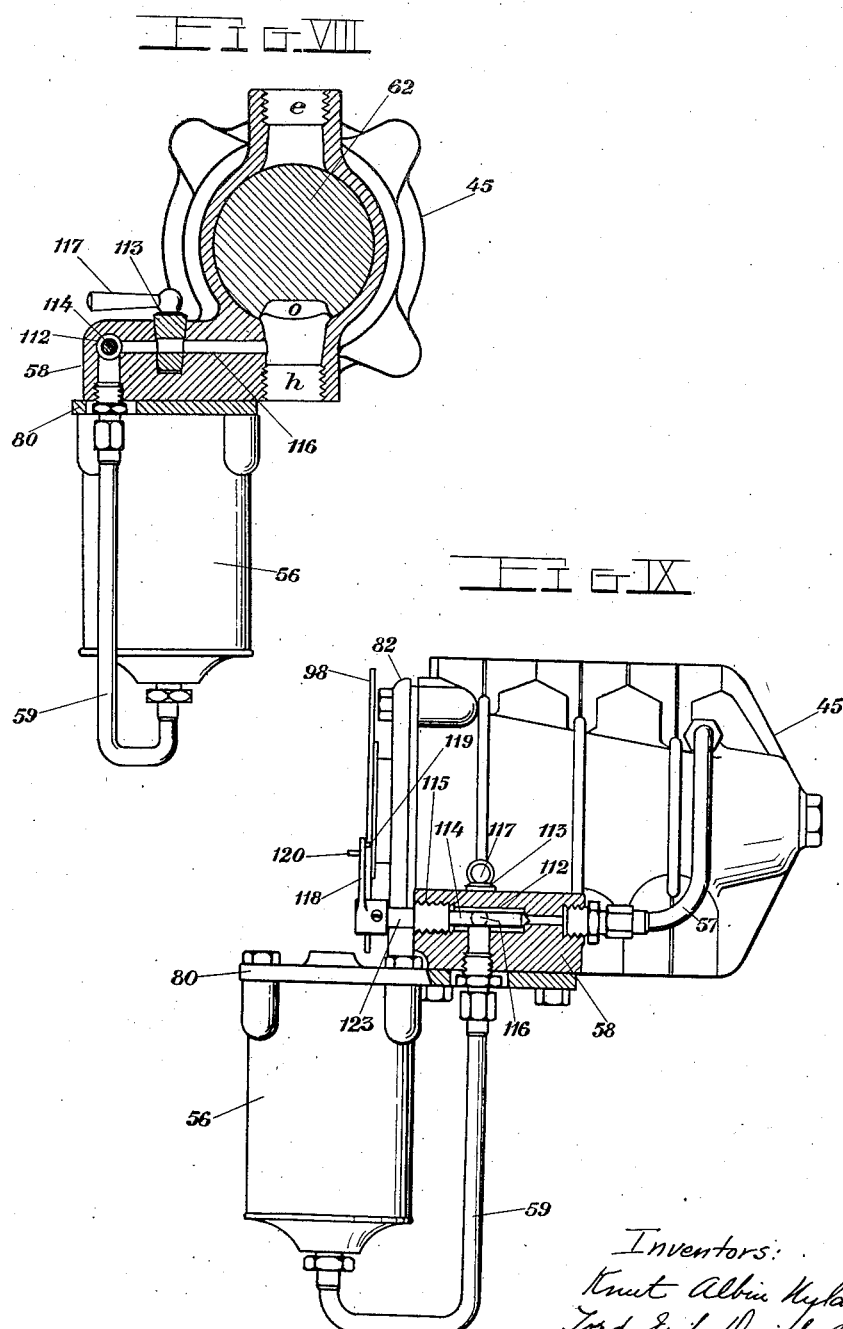

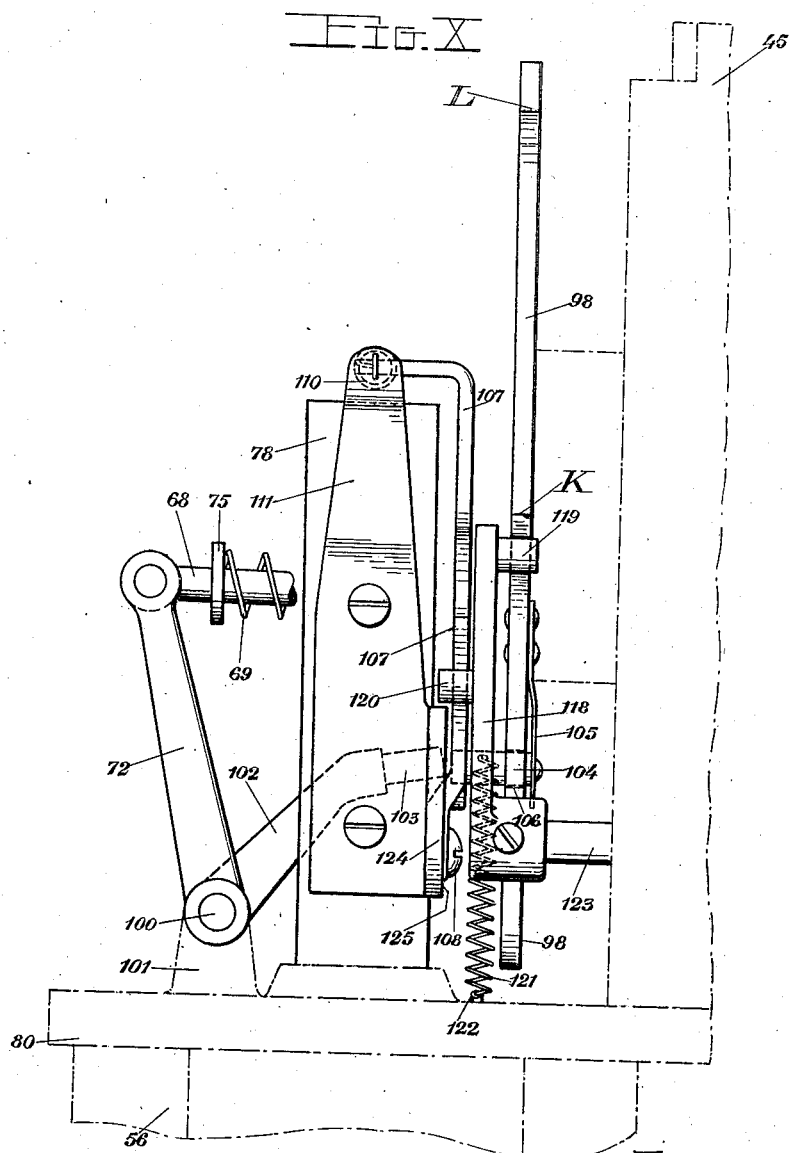

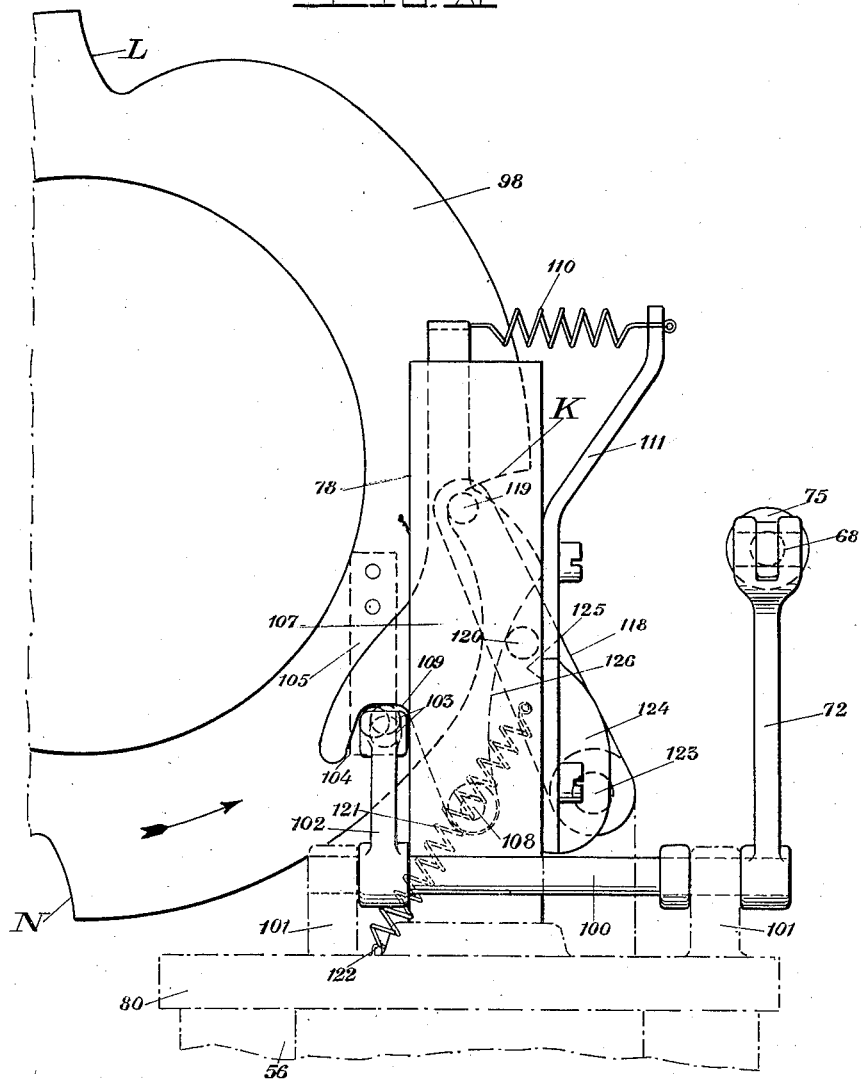

Patented Sept. 12, 1933

1,926,168

UNITED STATES PATENT OFFICE 1,926,168

CHEMICAL FILTERING DEVICE FOR WATER

Knut Albin Nylander and Tord Erik Daniel Bilde, Stockholm, Sweden

Application June 28, 1928, Serial No. 288,844, and in Sweden July 1, 1927

19 Claims. (Cl. 210—24)

The present invention relates to chemical water softening and purifying apparatus of the type in which base exchanging water softening material adapted to be periodically regenerated is employed.

More specifically the invention has reference to the type of apparatus in which softening and regeneration is repeatedly effected by a plurality of sequentially effected operations, and, still more specifically, in a cycle of four operations, in the first of which softening is effected by passing the raw water through a body of regenerative water softening material, in the second of which cleansing of and removal of sediment from such material is effected by flushing in reverse direction with raw water, in the third of which the exhausted material is regenerated by passing therethrough a saline solution, and in the fourth of which the material is rinsed to remove all traces of the saline solution, after which it is again ready to repeat the cycle. For the sake of convenience, all of the last three operations when referred to broadly, will be termed regenerating operations, as distinguished from the water softening operation.

Among the principal objects of the invention are: to effect periodic softening and regeneration entirely automatically by the use of hydraulic apparatus; to effect such periodic action through the medium of a single master valve; to operate said valve by hydraulic power actuated means; to effect automatically a predetermined timing of the several operations involved; to positively retain the apparatus in softening position; and to automatically and positively release the apparatus and energize the valve operating means to cause the regenerating operations to be effected when a predetermined quantity of water has passed through the apparatus.

The above, together with other and more detailed objects of the invention, will appear more fully in connection with the following description of the apparatus embodying the invention which is illustrated in the accompanying drawings.

In the drawings:

Fig. 1 is a diagrammatic elevation, partly in section, of a simple form of apparatus illustrating the general principles of the invention.

Fig. 2 is an elevation of a complete apparatus built in accordance with the invention.

Fig. 3 illustrates diagrammatically the several positions of the master valve and the connections made thereby.

Figs. 4 and 5 are fragmentary elevations on an enlarged scale of the master valve and its operating mechanisms, viewed from the front and the left respectively in Fig. 2.

Fig. 6 is a plan view of the apparatus shown in Figs. 4 and 5.

Fig. 7 is a section taken on line 7—7 of Fig. 5, certain elements being omitted.

Figs. 8 and 9 are elevations, partly in section of parts of the master valve and its operating mechanism, and Figs. 10 and 11 are further enlarged details of parts of the mechanism, viewed respectively as in Figs. 4, and 5, and with certain elements omitted.

The invention will first be described with reference to Fig. 1, in which a simplified apparatus embodying the general principles of the invention is illustrated.

In this figure, A denotes a reciprocating hydraulic servo-motor comprising a piston 3 in cylinder 5. The chamber below piston 3 is connected with a suitable source of fluid under pressure, preferably the water supply to the softening apparatus, by conduits 30 and 10, and this connection is controlled by valve 28 under the influence of spring 27.

The means for causing the servo-motor to be energized is indicated at B, and comprises a water meter located in the water supply or discharge pipe 1, said meter operating hammer 11 at predetermined intervals through the rotation of cam disc 14, which periodically lifts the hammer 11 about its pivot 12 and allows it to drop as the pin 13 reaches the radial cam face 36. Operation of the servo-motor is started due to this arrangement, whenever a predetermined amount of water has passed through the meter in pipe 1.

The single valve C for controlling fluid flow through the apparatus to effect both softening and regenerating operations, is shown as a four-way rotary plug valve consisting of plug 2 arranged in housing 4. Plug 2 is provided with four drain channels 6, 7, 8, and 9, adapted to register with the discharge conduit 29 in successive positions of the valve. Discharge conduit 29 connects with conduit 10 and is under the control of valve 28.

Plug 2 also carries the two rigidly mounted notched discs 22 and 23, the latter adapted to be held by suitable latches in four positions during each revolution of the valve.

An operating lever 20 is freely pivoted on the shaft of plug 2 and the free end of one arm of this lever is arranged to be engaged by a finger 35 on a pivotally mounted bell-crank lever 17, the latter being moved out of engaging position by impact from hammer 11. Bell crank 17 is formed with a boss 32 adapted to engage the notch 21 in disc 22. The other arm of lever 20 rests on a roller 25 mounted at the top of the servo-motor piston rod 24, so that reciprocation of piston 3 causes oscillation of lever 20 about its pivot.

Piston rod 24 is guided by an opening 34 formed in cover plate 33 of cylinder 5 and operates lever 26, one end of which is located in a slot in the rod and the other end of which engages a slot in valve 28: Lever 26 and spring 27 form a well known toggle action valve reversing arrangement for reversing the position of valve 28 as piston 3 reaches the ends of its stroke.

Lever 20 has mounted thereon the pivoted pawl 31 adapted to successively engage notches $a$, $b$, $c$ and $d$ in disc 23, and a weight 19 on the free end of the lever holds it in contact with roller 25 and tends to steady the motion of the mechanism.

Operation of this device is as follows: Assuming the hammer 11 is lifted to its highest position by cam disc 14, the bell-crank lever drops so that the finger 35 latches over the left end of lever 20, which is slightly depressed from the position shown in Fig. 1. In this position boss 32 is in notch 21 of disc 22, and valve 28 is in discharge position; i. e. reversed from the position shown in the figure so that conduits 10 and 29 communicate.

Movement of the meter disc 14 in clockwise direction, due to passage of water through pipe 1, causes pin 13 to drop along the radial face 36, thereby permitting hammer 11 to drop on arm 15 of the bell-crank lever 17. Movement of this lever in response to the impact of hammer 11, causes finger 35 to release lever 20 and also retracts boss 32 from the notch 21. It will be remembered that lever 20 is latched with the left end slightly depressed and the right end slightly raised. Upon release, weight 19 causes the right end of the lever to drop slightly and this movement causes pawl 31 to drop into notch $a$ of disc 23 and also causes lever 26 to move sufficiently to pass the dead center of the toggle controlling valve 28 and reverse the position of the latter. Water under pressure is now admitted below piston 3, which rises to lift lever 20 to the upper position II, shown in dotted lines in the figure. This movement of the lever causes, through the action of pawl 31, a quarter rotation of discs 22 and 23 and of the valve plug 2. As the piston reaches the upper limit of its stroke, lever 26 is engaged by the lower end of the slot in rod 24, and is carried over the dead center of the toggle to reverse valve 28, thus venting cylinder 5 by way of conduits 10 and 29 and the channel 7 in plug 2. The channel 7 constitutes a timing device, as the cross-sectional area of this channel determines the time necessary for the water to escape from cylinder 5 under the pressure caused by the weighted lever 20. The length of this time is governed by the requirements of the particular step of the regenerating operation effected by this valve position. As the lever 20 falls, due to the venting of cylinder 5, the discs 22 and 23 remain stationary and pawl 31 falls into notch $d$ as piston 3 reaches the bottom of its stroke while lever 26 reverses valve 28 to admission position.

Piston 3 again rises, advancing the discs and valve plug, and this operation is repeated three times, the pawl 31 successively engaging notches $d$, $c$ and $b$. It is to be noted that during this period finger 35 is prevented from latching over the left end of lever 20, due to the fact that boss 32 is riding on the face of disc 22. However, when piston 3 rises with pawl 31 in notch $b$, the complete revolution of disc 22 is accomplished, whereupon boss 32 falls into the notch 21, this action being possible because of the fact that the water used in the interim has caused disc 14 to partially raise hammer 11 to permit bell-crank lever 17 to move. As piston 3 now falls, lever 20 latches under finger 35 to prevent pawl 31 from falling into notch $a$, and the valve 28 is left in its venting position, causing the servo-motor to come to rest. The meter in pipe 1 continues to operate and upon the passage of a predetermined amount of water therethrough the pin 13 drops over the radial cam face 36, thereby permitting hammer 11 to drop and cause the above described cycle of operations to take place.

In Figs. 2 to 11 a commercially practical form of the invention is shown, as applied to a purifying device for softening water, said device containing base exchanging softening material which may be regenerated by passing a common salt solution therethrough.

Referring to Fig. 2, 40 denotes the raw water supply pipe having two branches, one of which, 41, leads by way of valve 43 to a container 44 for salt solution and the other of which, 42, leads to a single multiple-port master valve 45. The salt container, fitted at its upper end with a filling funnel 47 and stopper 48 provided with a known type of air valve, is also connected to valve 45 by pipe 46.

The water softening material is contained in the tank 51, the upper and lower portions of which are connected with valve 45 by pipes 49 and 50 respectively. Valve 45 is drained through pipe 52, and soft water is delivered from it through pipe 55 to the meter 54 and service pipe 53.

Water for operating the servo-motor 56, which actuates the master valve, is supplied from the master valve casing through pipe 57, casing 58 enclosing a servo-motor control valve and pipe 59.

Turning to Fig. 3, the master valve 45, having a multiple-port rotary plug or spindle 62, is diagrammatically shown with the latter in the four different positions which cause the cycle of softening and regenerating operations to be effected, the several positions being designated D, E, F, and G. The valve casing is provided with inlet and outlet ports $e$, $f$, $g$, $h$, $j$ and $k$, which are connected respectively with pipes 46, 49, 42, 52, 50 and 55, while the spindle or plug 62 is provided with recesses $m$, $o$ and $p$, and channels $n$, $q$ and $r$.

The manner in which the single master valve causes the successive water softening and regenerating operations to be effected is as follows: With the valve in the position shown at 3D, raw water flows from pipe 42 through port $g$, channel $n$, port $f$ and pipe 49 to the top of tank 51, thence downward through the softening material in the tank, through 50, port $j$, recess $p$, port $k$ and pipe 55 to the meter 54 and service pipe 53. Movement of spindle 62 to the position shown at 3 E causes a reverse flushing operation to occur with flow through tank 51 in an upward direction. In this valve position, raw water from 42 flows by way of port $g$, channel $v$, port $j$ and pipe 50 to the bottom of tank 51, upwardly through the tank and by way of pipe 49, port *f*, channel *q*, and port *h* to the drain pipe 52. In the third position of the valve, shown at 3 F, brine from container 44 flows through pipe 46, port *e*, recess *o* port *f*, and pipe 49 to the top of the tank, thence downwardly through the water softening material to regenerate the same, and from the bottom of the tank to the drain pipe 52 by way of pipe 50, port *j*, recess *m* and port *h*. In the next position of the valve, shown at 3 G, all traces of salt solution are removed from the tank by the flow of water from pipe 42 through port *g*, channel *v*, port *f* and pipe 49 to the top of tank 51, downwardly through the tank, and to drain pipe 52 by way of pipe 50, port *j*, channel *q*, and port *h*.

From the above it will be seen that the four successive positions of valve spindle 62 cause the complete cycle of operations incident to the functioning of the apparatus to take place, these four positions being encompassed by one revolution of the valve spindle.

In order to insure an uninterrupted supply of water to the service line 55, 53, channels *u* and *v* are formed in such manner that a by-pass from supply pipe 42 to the service line pipe 55 is provided in all valve positions except the water softening position shown at 3 D. The manner in which this is accomplished will be evident from an inspection of 3 E, 3 F and 3 G.

In its practical embodiment, the master valve may advantageously take the form shown in Fig. 7, in which the conical plug or spindle 62 is held seated in the valve housing 45 by means of spring 83, placed between one end of the spindle and the housing cover plate 82. Rotation of the spindle 62 is effected by shaft 81, which extends through a suitable stuffing box in cover plate 82.

The mechanism for automatically operating the master valve will now be described.

The valve shaft 81 is rotated by means of the hub 95, clamping against the shoulder 96 of valve shaft 81 by stud 92, washer 91 and bushing 81*a*, and grooved as at 99. The flanges at the sides of groove 99 are notched at *s, t, u, v*, and the hub further carries a cam disc 98, larger in diameter than the hub, and formed with four irregularly shaped cam notches K, L, M, and N.

A drum 90 is loosely mounted over the bushing 81*a*, this drum being held in position by washer 91 and stud 92. Fixed to either side of the drum are plates having arms 89 thereon, to which are attached one end of a spiral spring 94, the latter being wrapped around groove 93 in drum 90 and secured at its other end to the fixed plate 80. From Fig. 5 it will be evident that spring 94 will tend to rotate drum 90 and arms 89 in clockwise direction from the position shown in this figure.

A servo-motor cylinder 56 is carried by plate 80 and has mounted therein a piston 76, packed as at 77. A piston rod 78, of channel section, passes through plate 80 and is guided thereby, the upper end of the rod having attached thereto by bolt 85 one end of a chain 86. The other end of the chain is provided with a pawl 87 which is pivotally secured to the ends of arms 89 by bolt 88. Chain 87 lies in the plane of groove 99 and the pawl 87 is adapted to engage the several notches in the flanges of hub 95 to rotate the hub assembly and valve in counterclockwise direction as the servo-motor piston rises.

The servo-motor is periodically actuated through the medium of the water meter 54 (Figs. 4 and 6) which turns shaft 63 having mounted thereon the cam plate 65. Plate 65 has a radial face 64. A weight 66, slidably mounted on shaft 68, has a projecting pin 67 engaging the face of cam plate 65, said pin being held in engagement by the pressure of a spiral spring 69 around shaft 68 and compressed between weight 66 and a shaft collar 75. Near the right end of shaft 68 a second collar 70 is pinned, and a spiral spring 74 surrounds the shaft between this collar and the bearing 71 in which the right hand end of the shaft is slidably mounted. Movement of shaft 68 to the left of the position shown in Fig. 4 is prevented by stop nut 73. The left hand end of shaft 68 is pivotally secured to the end of a lever 72.

As shown more clearly in the fragmentary Figures 10 and 11, lever 72 is rigidly secured to a transverse shaft 100 pivotally secured in bearing blocks 101 on plate 80. A second lever 102 is fixedly secured to the left end of shaft 100, this lever lying at an angle to lever 72, as seen in Fig. 10.

The free end of lever 102 is provided with a release pin adapted to strike and cause to be retracted a pin 104 projecting through a hole 106 in the cam plate 98, said pin 104 being carried by a flat spring 105 secured to the plate and normally holding the pin in projected position. Pins 103 and 104 are slightly offset for a reason that will appear later.

Near the top of piston rod 78, a latch plate 107 is pivoted at 108, said plate having a curved face 126 on the right side and on the left side being provided with a finger forming a latching recess 109 adapted to be engaged by pin 104. Plate 107 is biased to the right by spring 110 carried by the plate 111 secured to piston rod 78.

Turning now to Figs. 8 and 9 it will be seen that the master valve housing 45 forms a casing 58 having a needle valve bore 112 therein in which is located the needle valve 114, the latter being opened and closed through the medium of the shaft 123, threaded through housing 58 with threads 115 of high pitch and operated by lever 118 secured to the outer end of the shaft. Regulation of the water supplied to the servo-motor through pipes 57 and 59 is secured by rotation of valve 114. Bore 112 is further connected to the drain pipe 52 by means of passage 116 and port *h*, there being a regulating valve 113, adjustable by means of the manually operable lever 117, located in passage 116.

Referring again to Fig. 10, it will be seen that lever 118 is provided with two operating pins 119 and 120, the former extending to the right at the upper end of the lever and adapted to engage the cam plate 98, while the latter extends to the left about midway of the length of the lever and is adapted to engage the curved face 126 of the latch plate 107. Lever 118 is biased to the left (as viewed in Fig. 11) by a spring 121 secured at 122 to plate 80, but it is to be noted that this spring is weaker than spring 110 tending to move plate 107 in the opposite direction and may be overbalanced thereby. It is further to be noted that movement of lever 118 to the right acts to open valve 114.

The lower portion 124 of plate 111 is bent into a plane parallel with the lever 118, said portion having a curved edge 125 over which pin 120 is adapted to slide.

The operation of the device is as follows: Assume that the master valve is in the position shown in Fig. 3 D, so that softening is being effected as previously described, and that sufficient water has passed through the apparatus to exhaust the softening material. At this time, due to the passage of the predetermined quantity of softened water through meter 54, the meter disc 65 has been moved to a position permitting pin 67 to slide along the radial face 64. When this occurs, weight 66 is forced to the right (Fig. 4) by spring 69 and the impact of the weight on collar 70 forces shaft 68 to the right against the action of spring 74. This movement likewise causes pin 103 (Fig. 10) to move to the right and retract pin 104 against the action of spring 105. The instant pin 104 is retracted, spring 110 (Fig. 11) pulls the latch plate 107 to the right, the latch finger on this plate passing pin 103, which as previously noted is offset with respect to pin 104 and is moreover, practically instantly returned to the position shown in Fig. 10 by the action of spring 74 (Fig. 4). Motion of the latch plate 107 to the right (Fig. 11) moves pin 120 and lever 118 to the right, thereby opening needle valve 114 to cause actuation of the servo-motor by water from the raw water supply admitted through pipes 57 and 59. The initial opening of valve 114 is sufficient to supply more water to the bore 112 than can escape through valve 113, which is permanently set to form a timing device governing the speed at which the servo-motor operates by fixing the ratio of the inlet opening to the constantly open outlet. The size of the outlet opening through valve 113 is determined in part by the hardness of the water to be treated and in part by the pressure of the water supply.

The unlatching movement of plate 107 under the influence of plate 110, causes pin 120 to move to the right (Fig. 11) of plate 111, and as this plate moves upward with piston rod 78, due to the initial opening of valve 114, pin 120 is carried still further to the right as it slides over face 125 of the lower plate portion 124. This opens valve 114 still further to accelerate the movement of the piston 76.

Upward movement of piston rod 78 rotates the master valve in counter clockwise direction, due to the action of chain 86 (Fig. 5) and pawl 87, which is in engagement with notch $v$ in the flange of hub 95. Chain 86 also carries arms 89 to the position shown in Fig. 5, placing spring 94 under tension.

From Fig. 11 it will be evident that as pin 120 is moved to the right by the face 125 of plate portion 124, the pin 119 will be lifted from the notch K in disc 98, and after the plate portion 124 has passed above pin 120, the lever 118 is held in its right hand position by pin 119 sliding along the circumferential face of disc 98 between notches K and N. Valve 114 is thus held open during the full stroke of the servo-motor piston. When the servo-motor piston reaches the top of its stroke, the master valve has been rotated 90° to the position shown in Fig. 3 E, and the needle valve operating lever is snapped to the left by spring 121 as pin 119 drops into notch N in disc 98. Spring 121 is able to act, as with the piston at the top of its stroke, pin 120 is out of contact with the latch plate 107. The degree to which the needle valve 114 is closed by this movement of lever 118 is obviously dependent upon the depth of notch N.

The reverse flow flushing action which takes place at this time has already been described.

With pin 119 in notch N, the needle valve is closed to a point such that the opening therethrough (if any) is less than the constant outlet opening through valve 113, and the water is forced from the cylinder by the downward pressure of piston 76, the latter being returned to its lower position by spring 94 (Fig. 5) which also turns drum 90 back 90° so that pawl 87 engages the next notch $u$ in the flange of hub 95.

During the return or downward motion of the piston, pin 120 slides along the inner or left hand face (Fig. 11) of plate 111, thereby preventing lever 118 from being moved to the right to open valve 114 as pin 120 again comes into contact with face 126 of the latch plate 107. Instead, the latch plate 107 is forced to the left by pin 120 until the piston reaches the bottom limit of its stroke, at which point pin 120 passes over the top of the plate portion 124, thus permitting spring 110 and latch plate 107 to force pin 120 to the right and again open valve 114.

The servo motor piston is again forced up in the manner previously described, to move the master valve to the position shown at 3 F, thus causing the salt solution from container 44 to be passed through the softening material to regenerate it. During the period when the master valve is in this position, the position of valve 114 is determined by the depth of notch N, and the ratio of this valve opening to the fixed opening through valve 113 determines the time required for the servo motor piston to return to the lower end of its stroke. It follows from this that this timing arrangement determines the length of time the master valve remains in position 3 F to cause the regenerating operation to continue.

When the servo-motor piston reaches the bottom of its stroke, valve 114 is again opened and the master valve advanced by the servo-motor to position 3 G, which causes the softening material to be flushed to remove any traces of saline solution remaining from the preceding operation. The servo-motor piston again falls, valve 114 is once more opened, and the piston again rises, this time moving the master valve to its original position, i. e., the position causing softening to be effected.

As the servo-motor piston is brought down by the action of spring 94, the finger on the latch plate 107 comes down over the pin 104 in disc 98, which by this time has been turned through a complete revolution, so that pin 104 in the recess 109 prevents the latch plate from causing valve 114 to again be opened.

The servo-motor now remains inactive until a predetermined amount of water flowing through meter 54, causes the entire cycle of operations to be repeated.

Container 44 will, in the form shown, hold sufficient salt to provide a saline solution for approximately 30 regenerating operations, and may be filled from time to time by removal of stopper 48, after valve 43 has been closed to cut off the raw water supply pressure in pipe 41.

From the foregoing description it will be evident that periodic regeneration of the water softening material is effected wholly automatically, and while the apparatus illustrated is subject to modification and change, the invention is intended to embrace all forms of apparatus which may fall within the scope of the appended claims.

We claim—

1. Regenerative water softening apparatus comprising in combination a vessel adapted to contain a body of regenerative water softening material, a plurality of conduits arranged to permit water softening and regenerating operations to be effected, a single rotary multiple-port master valve having ports for controlling flow through each of said conduits, a hydraulic motor for automatically moving said valve into different positions to cause said operations to be effected, mechanism comprising mechanical means for positively locking said valve when the valve is positioned to permit water softening operation and means for rendering said motor inoperative when said valve is in water softening position, a water meter, and means adapted to be periodically actuated by said water meter for mechanically tripping said mechanism to permit operation of said motor and movement of said valve to cause regenerating operations to be effected.

2. Regenerative water softening apparatus comprising in combination a vessel adapted to contain a body of regenerative water softening material, a plurality of conduits arranged to permit water softening and regenerating operations to be effected, a single rotary master valve movable to a plurality of positions for controlling flow through said conduits, a hydraulic motor comprising a reciprocating piston, means for causing successive movements of said piston in the same direction to move said valve in step by step progression to its several positions to cause softening and regenerating operations to be effected, resilient means for returning the piston in the other direction and means having a position determined by the position of the master valve for timing movement of the piston in said other direction.

3. Automatic regenerative water softening apparatus comprising valve means controlling operation of the apparatus, a servo-motor for actuating said valve means and a timing device operating in response to movement of said valve means for automatically regulating the operating speed of said servo-motor.

4. Automatic regenerative water softening apparatus comprising valve means controlling operation of the apparatus, a hydraulic servo-motor for actuating said valve means, a valve for controlling the admission of operating fluid to said servo-motor and means moving in response to movement of said valve means for holding said valve open to a predetermined degree.

5. Automatic regenerative water softening apparatus comprising a single master valve movable to a plurality of positions for controlling operation of the apparatus, a hydraulic servo-motor for actuating said valve, a second valve for controlling the admission of operating fluid to the servo-motor, means for opening said second valve and means moving with the master valve for holding the valve opening means in predetermined positions at a plurality of positions of the master valve.

6. Automatic regenerative water softening apparatus comprising a rotary master valve movable to a plurality of positions for controlling operation of the apparatus, a hydraulic servo-motor for actuating said valve, a second valve for controlling the admission of operating fluid to the servo-motor, a pivoted lever for operating said second valve, and a cam disc moving with said master valve, said disc moving said lever to different positions to control the operation of the servo-motor as the master valve is moved.

7. Automatic regenerative water softening apparatus comprising a single master valve for controlling operation of the apparatus, a hydraulic servo-motor for actuating the valve, a second valve for admitting operating fluid to the servo-motor, means operating in response to movement of the master valve for varying the opening through said second valve, and means forming a constantly open outlet from said servo-motor.

8. Automatic regenerative water softening apparatus comprising a single master valve for controlling operation of the apparatus, a hydraulic servo-motor for actuating the valve, a second valve for admitting operating fluid to the servo-motor, means operating in response to movement of the master valve for varying the opening through said second valve, means forming a constantly open outlet from said servo-motor and means for manually adjusting the area of said outlet.

9. Automatic regenerative water softening apparatus comprising a master valve for controlling operation of the apparatus, a hydraulic servo-motor for actuating the valve, a second valve for admitting operating fluid to said servo-motor, means operating at predetermined intervals to partially open said second valve and means acting in response to said partial opening to increase the opening of the valve.

10. Automatic regenerative water softening apparatus comprising a rotary master valve movable to a plurality of positions for controlling operation of the appartus, a hydraulic servi-motor comprising a reciprocating piston, means for causing a stroke of the piston in one direction to move the valve from any given position to a succeeding position, a second valve for admitting operating fluid to said piston to move it in said one direction, means operating at predetermined intervals to partially open said valve, means moving in response to said partial opening to increase the opening of the valve, and means moving with said master valve for maintaining said second valve in open position until the piston reaches the end of its stroke.

11. Automatic regenerative water softening apparatus comprising a rotary master valve movable to a plurality of positions for controlling operation of the apparatus, a hydraulic servo-motor comprising a reciprocating piston and rod, means for causing a stroke of the piston in one direction to move the valve from any given position to a succeeding position, a second valve for admitting operating fluid to said piston to move it in said one direction, means operating at predetermined intervals to partially open said valve to cause an initial movement of the piston and rod in the one direction, means moving with the rod the causing the opening of the valve to increase, means moving with the master valve for maintaining said second valve in open position until the piston reaches the end of its stroke, means for closing said second valve to a predetermined degree when the piston reaches the end of its stroke, mechanical means for effecting a return stroke of the piston, and means moving with the piston rod for preventing opening of the second valve during the return stroke of the piston.

12. Automatic regenerative water softening apparatus comprising a rotary master valve movable to a plurality of positions for operating the apparatus, a cam disc rigidly secured to said valve, said disc having a notch corresponding to each position of the valve, a hydraulic servo-motor for actuating the valve, a second valve controlling the rate of flow of operating fluid to and from the servo-motor, and means engaged by said cam disc for positioning said second valve in accordance with the contour of said disc, whereby the degree to which said second valve is opened in each position of the master valve is determined by the depth of the notch corresponding to such position.

13. Regenerative water softening apparatus of the type in which water softening and regeneration are effected by a cycle of four operations, comprising a rotary four-way valve movable in one revolution from a first position causing the water softening operation to be effected through three other positions causing the regenerating operations to be effected and again to said first position, means for automatically holding said valve when it is moved to the first position, means for automatically releasing said holding means at predetermined intervals and means for automatically moving said valve through one revolution upon the release of said holding means.

14. Regenerative water softening apparatus of the type in which water softening and regeneration are effected by a cycle of four operations, comprising a rotary four-way valve movable in one revolution from a first position causing the water softening operation to be effected through three other positions causing the regenerating operations to be effected and again to said first position, means for automatically holding said valve when its is moved to the first position, a water meter, means actuated automatically upon the passage of a predetermined quantity of water through the meter for releasing said holding means and means acting automatically upon the release of the holding means to move said valve through one revolution.

15. Regenerative water softening apparatus of the type in which water softening and regeneration are effected by a cycle of four operations, comprising a rotary four-way valve movable in one revolution from a first position causing the water softening operation to be effected through three other positions causing the regenerating operation to be effected and again to said first position, means for automatically holding said valve when it is moved to the first position, a water meter, means actuated automatically upon the passage of a predetermined quantity of water through the meter for releasing said holding means, means acting automatically upon the release of the holding means to move said valve through one revolution and automatic timing means governing the time required to move the valve through one revolution.

16. Regenerative water softening apparatus comprising a rotary multiple-port valve movable in a series of steps from a first position causing water softening to be effected to a plurality of other positions causing regenerating operations to be effected and again to said first position, means for holding said valve in said first position, means for automatically releasing said holding means at predetermined intervals, means for moving said valve automatically upon release of said holding means from said first position to each of the other positions and again to the first position, said last named means acting to move the valve intermittently from one position to the next succeeding position, and means controlling the valve moving means to automatically time the interval between movements of the valve.

17. Regenerative water softening apparatus comprising in combination a vessel adapted to contain a body of regenerative water softening material, a plurality of conduits arranged to permit water softening, flushing, regenerating and rinsing operations to be effected, a rotary four-way valve movable in one revolution from a first position causing water softening operation to be effected through three other positions causing flushing, regenerating and rinsing operations to be effected in the order named and again to said first position, a hydraulic motor for turning said valve through one revolution, latching means normally acting to maintain said valve in water softening position and to render said motor inoperative, and a water meter operating in response to the passage of a predetermined quantity of water through the meter for releasing said latching means, said motor acting upon release of said latching means to turn said valve through one revolution and said latching means automatically re-engaging after one revolution of the valve.

18. Regenerative water softening apparatus comprising in combination a vessel adapted to contain a body of regenerative water softening material, a plurality of conduits arranged to permit water softening and regenerating operations to be effected, said conduits including a supply conduit and a service conduit, a single rotary multiple-port master valve for controlling flow through each of said conduits, a servo-motor utilizing static water pressure from said supply conduit for turning said valve progressively in the same direction through a plurality of successive positions to cause said operations to be effected and said valve being ported to provide a connection between said supply and said service conduits in each of said different positions, mechanism for holding said valve and for rendering said servo-motor inoperative when said valve is in a position permitting water softening, and means for releasing said holding mechanism, said servo-motor operating automatically upon release of said mechanism to turn said valve progressively in the same direction to said different positions to cause said operations to be effected.

19. Automatic regenerative water softening apparatus comprising a rotary master valve movable to a plurality of positions for controlling operation of the apparatus, a hydraulic servo motor for moving said valve progressively to each of said positions, means for automatically causing said servo motor to move the valve intermittently from any given position to a succeeding position and conduit means for admitting and for discharging motive fluid from said servo motor, said conduit means comprising a throttling device for controlling the rate of flow of operating fluid from said servo motor whereby to regulate the intervals between movements of said valve.

KNUT ALBIN NYLANDER.
TORD ERIK DANIEL BILDE.